US008045761B2

(12) United States Patent
Badawy et al.

(10) Patent No.: US 8,045,761 B2
(45) Date of Patent: Oct. 25, 2011

(54) DETECTION OF ENVIRONMENTAL CONDITIONS IN A SEQUENCE OF IMAGES

(75) Inventors: Wael Badawy, Calgary (CA);
Mohammed Shehata, Calgary (CA);
Muzamil Shah Pervez, Calgary (CA);
Jun Cai, Calgary (CA); Ahmad Radmanesh, Calgary (CA); Tyson Burr, Calgary (CA)

(73) Assignee: IntelliView Technologies Inc., Calgary (CA)

( * ) Notice: Subject to any disclaimer, the term of this patent is extended or adjusted under 35 U.S.C. 154(b) by 1027 days.

(21) Appl. No.: 11/444,170

(22) Filed: May 30, 2006

(65) Prior Publication Data

US 2007/0280504 A1 Dec. 6, 2007

(51) Int. Cl.
*G06K 9/00* (2006.01)
*G06K 9/40* (2006.01)
*G06K 9/32* (2006.01)
*H04N 7/18* (2006.01)

(52) U.S. Cl. ........ 382/104; 382/254; 382/294; 248/122; 248/143

(58) Field of Classification Search ............. 382/104, 382/100, 156–162, 294, 254; 362/465–466; 340/600, 601; 250/208.1; 348/122, 143
See application file for complete search history.

(56) References Cited

U.S. PATENT DOCUMENTS

| 5,611,000 | A | 3/1997 | Szeliski | |
|---|---|---|---|---|
| 6,037,976 | A | 3/2000 | Wixson | |
| 6,049,281 | A | 4/2000 | Osterweil | |
| 6,137,531 | A * | 10/2000 | Kanzaki et al. | 348/149 |
| 6,349,113 | B1 * | 2/2002 | Mech et al. | 375/240.08 |
| 6,493,041 | B1 | 12/2002 | Hanko | |
| 6,625,310 | B2 | 9/2003 | Lipton | |
| 6,628,805 | B1 * | 9/2003 | Hansen et al. | 382/107 |
| 6,654,481 | B2 * | 11/2003 | Amemiya et al. | 382/103 |
| 6,922,486 | B2 | 7/2005 | Risson | |
| 7,366,323 | B1 * | 4/2008 | Yao et al. | 382/103 |
| 2005/0249426 | A1 | 11/2005 | Badawy | |

FOREIGN PATENT DOCUMENTS

CA 2466247 A1 5/2005

OTHER PUBLICATIONS

Bevilacqua et al, Effective Shadow Detection in Traffic Monitoring Applications, The 11-th International Conference in Central Europe on Computer Graphics, Visualization and Computer Vision'2003, WSCG 2003.*

(Continued)

*Primary Examiner* — Gregory M Desire
*Assistant Examiner* — Andrae S Allison
(74) *Attorney, Agent, or Firm* — Christensen O'Connor Johnson Kindness PLLC

(57) ABSTRACT

A method for determining the presence and location of static shadows and other ambient conditions (such as glare, snow, rain, etc.) in a series of time-successive images is provided. Each image comprises a series of image elements locatable on a plane, with each element being associated with a color defined by three chromatic elements. Furthermore, each image is partitioned into a set of elements, with each element comprising one or more pixels. According to the process of the present method, the ambient conditions are detected using a mixture of processes which utilize the chromatic elements, luminance qualities and temporal characteristics of the series of images.

13 Claims, 17 Drawing Sheets

OTHER PUBLICATIONS

Salvador et al, Cast shadow segmentation using invariant color features, Computer Vision and Image Understanding 95 (2004) 238-259.*

Landabaso J.L., Pardàs M. and Xu L.Q., Shadow removal with morphological reconstruction, In Proceedings of Jornades de Recerca en Automàtica, Visió i Robòtica (AVR), Barcelona (Spain), 2004.*

A. Bevilacqua and M. Roffilli, "Robust denoising and moving shadows detection in traffic scenes", IEEE Computer Society Conference on Computer Vision and Pattern Recognition, Kauai Marriott, Hawaii, Dec. 9-14, 2001.*

R. Cucchiara, C. Grana, A. Prati, M. Piccardi, "Detecting Objects, Shadows and Ghosts in Video Streams by Exploiting Color and Motion Information," iciap, pp. 0360, 11th International Conference on Image Analysis and Processing (ICIAP'01), 2001.*

Cheung, S.-C.S., and C. Kamath, "Robust Techniques for Background Subtraction in Urban Traffic Video," Proceedings of Video Communications and Image Processing Conference 5308, Int'l Society for Optical Engineering (SPIE), San Jose, California, Jan. 20-22, 2004, pp. 881-892.

Fuentes, H.A., and O. Gonzalez, "Implementation of a 2D Real-Time Correlator Based on a DSP," Texas Instruments Audio and Video/Imaging Series, TechOnLine, Oct. 3, 2005.

Lewis, J.P., "Fast Normalized Cross Correlation," Industrial Light & Magic, Nov. 2005.

Salvador, E., et al., "Shadow Identification and Classification Using Invariant Color Models," Proceedings of IEEE International Conference on Acoustics, Speech, and Signal Processing 3:1545-1548, 2001.

United States Congress, "Intermodal Surface Transport Efficiency Act of 1991," Public Law 102-240, Dec. 18, 1991.

* cited by examiner

DETECTION OF ENVIRONMENTAL CONDITIONS IN A SEQUENCE OF IMAGES

BACKGROUND

Video-based Automated Incident Detection AID systems are becoming increasingly adopted to monitor roadways for traffic incidents without the need for human operators. These systems, while proficient in detecting real incidents, are not so adept in discriminating these from ordinary scene changes. Examples of such problems stem from issues such as the appearance of stationary shadows on the roadway, a vehicle's headlight beam reflecting from a road sign, vehicles pushing snow aside as they move through it, and water splashing on a roadway. As a result many false alarms are often generated, lowering the accuracy of the AID system in totality. This is the result of many AID systems not having been designed to anticipate complex lighting conditions, with changing cloud cover and/or stationary objects off camera suddenly casting shadows with a change in lighting. This problem requires rectification.

To combat this, a new method is needed to segment the video images into elements, marking the elements of the frame that contain static shadows. This would allow the sensitivity of the AID system to be lowered in these elements and result in fewer false alarms. This is a difficult task for many reasons. First, static shadows must be discriminated from moving shadows, the latter being shadows that are cast by vehicles traveling down the roadway. Secondly, the algorithm must be robust enough to work at all times from dawn until dusk, in spite of the changing lighting of the scene due to the position of the sun or cloud coverage. Thirdly, the method needs to work in a variety of camera placements such that manual parameter adjustment is not possible for each camera; hence, adaptive methodologies are introduced in lieu of manual calibration. Fourth, since the algorithm is expected to detect static shadows before the AID system does, the method must operate in real time and be relatively low in computational complexity.

SUMMARY

There is provided a method for detecting environmental conditions in a traffic image sequence with emphasis on detecting static shadows on a roadway in the image sequence as well as other ambient conditions. In one method for detecting environmental conditions each image is partitioned into elements, each element comprising a set of one or more pixels which are locatable in the plane of the image. Each pixel is associated with one set of three chromatic components, and one luminance or Graylevel value. An element may be a point. An image may be a frame or an image frame.

In a method for detecting environmental conditions, ambient conditions may be detected using a mixture of processes which utilize the chromatic elements, luminance qualities and temporal characteristics of the series of images. An embodiment of the method is divided into four modules which each detect and create maps for one ambient condition; one of static shadow, glare, snow and rain detection. The method may operate in real-time and uses only image information and local time to determine the environmental conditions present in the scene.

For static shadow detection, a background image may be first built from a median filtered initial sequence of time-successive frames taken at sunrise time local to the camera's geographical placement. Each element in subsequent frames may be compared with its respective location in the background image to determine a change in luminance. Elements whose luminance values changed within a certain adaptive threshold may be marked as shadow candidates. Moving shadows may be filtered by use of moving object detection, and an extra filter is used to restrict the detection to roadways. Elements which pass these various tests may be determined to be static shadows.

For glare detection, according to one embodiment, each element in a frame is examined to determine if its luminance is greater than a given threshold. Of these elements which pass this threshold, elements which are determined to correspond to motion are filtered from the final detection map. Elements which pass these tests are determined to be areas where glare exists in the image.

For snow detection, in one embodiment, the difference is calculated between a recent background image of a scene built from a median filtered sequence of glare-subtracted time-successive frames and the next most recent background image to find significant changes in each element of the scene. The current and previous background images are both correlated to a snow sample through a similarity test and differenced to find changes to snow in the scene. This algorithm works by transforming subsections of the background images into a form which can be correlated to the snow sample images in order to determine the similarity of a pixel in the scene to snow. Thresholds are applied to the difference image and the difference of the correlation images. Elements which pass these tests are determined to be areas where moving snow exists in the image.

For rain detection, each element may be examined to determine the areas in the scene where rain is present, then these rain detected areas may be examined to extract elements which have undergone recent change.

Further summary of these methods for detecting environmental conditions resides in the description below, which refer at times to the annexed drawings which illustrate the methods used.

BRIEF DESCRIPTION OF THE FIGURES

Embodiments will now be described with reference to the figures, in which like reference characters denote like elements, by way of example, and in which.

DETAILED DESCRIPTION

Various embodiments of environmental detection methods will now be described in detail with reference to the figures. The embodiments are intended to be illustrative of methods defined by the claims.

The concept of identifying ambient conditions such as static shadow, glare, rain and snow in an image can be understood as the detection and marking of the presence or not of the ambient conditions at each point comprising an image. This interpretation is binary, meaning that after detection for every point in the image, an ambient condition is considered as strictly either present or absent. The information which includes the location and presence one of these ambient conditions, such as static shadows, in an image is encoded to a shadow map on a point by point basis, and can be overlaid with the original image, allowing for a simple recognition and understanding of shadowed and non-shadowed areas.

The process of static shadow detection is enacted upon a time-consecutive series of images which together form a video stream. Each individual image is more commonly referred to as a frame. The view of the camera which records these images should be elevated and angled down towards the scene with a clear, unobstructed view.

Each image is composed of a set of elements. The number of elements which make up a given image depends entirely on the resolution of the apparatus which recorded the scene or the sensitivity of the detection or a combination of both. In this case a digital video camera, radar image, or ultra sound source would serve as such an apparatus.

The image elements themselves each reference a single location in an image (they can be overlapped or non-overlapped). Each element is attributed with a pair of coordinates and a number of pixels which allow its location to be mapped to a two-dimensional plane wherein the axes of the two dimensions are usually but not necessary orthogonal to each other. This ability to index individual pixels is crucial to video processing.

Figure 1:
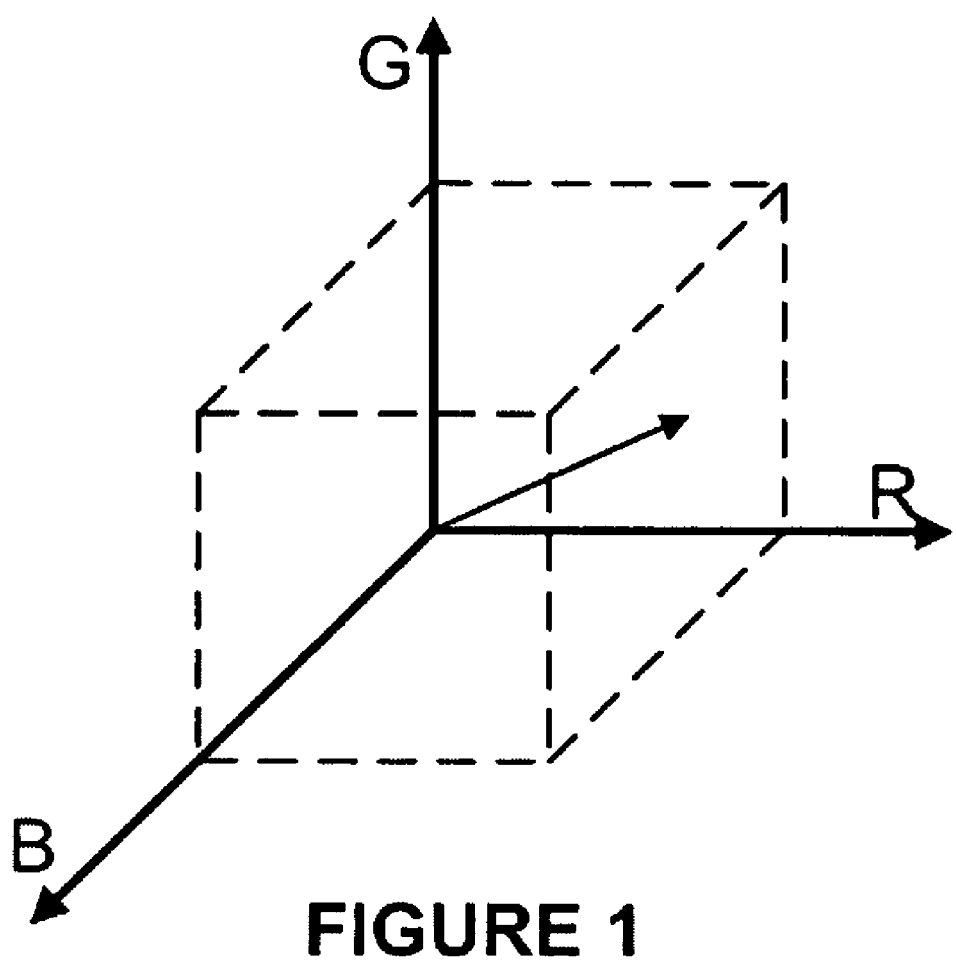
FIG. 1 is a graphic representation of a RGB color space, whereby a point is described by its composition of primary color components, and represented as a vector.

Each element, also referred to as a set of pixels, is associated with chromatic components which in concert describe a single color. In the case of three colors: R, G and B form the three components and stand for the relative weight of the primary colors of Red, Green and Blue respectively. As seen in FIG. 1, the color of any pixel can be represented by a vector in three-dimensional space wherein each of the primary colors represents a single axis of the RGB color space.

In addition to having many chromatic components, each pixel can also be represented by a single value which represents its brightness in an average form. This value, called the graylevel, is formed by taking the average of the three color components.

Figure 2:
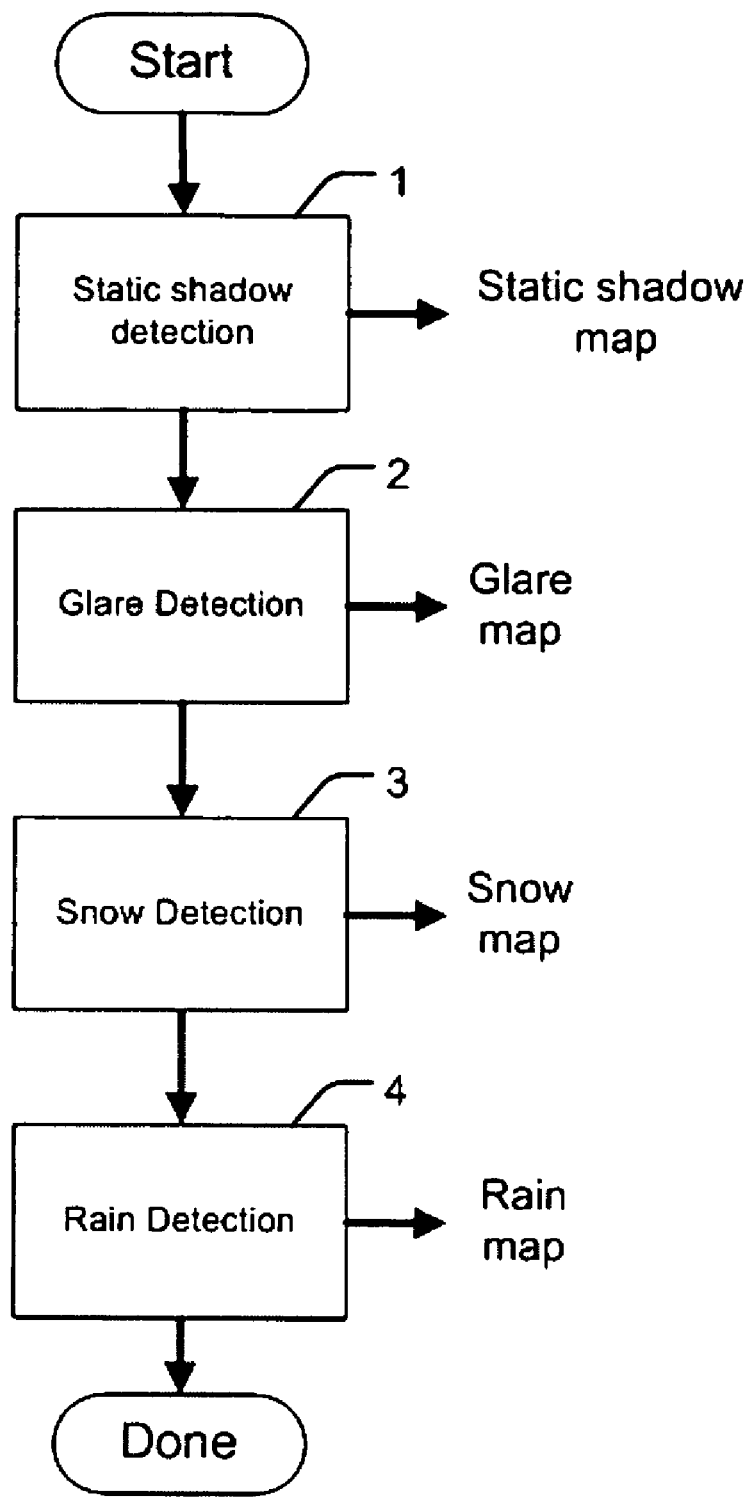
FIG. 2 shows a flowchart corresponding to an implementation of the main embodiment of the method.

FIG. 2 depicts the top-level embodiment of the method for detecting environmental conditions in a sequence of image frames. In FIG. 2, a series of four detection algorithms run to produce four distinct maps profiling the locations of each of the ambient conditions.

In Step 1, the presence or not of static shadows is detected in the scene and mapped accordingly. This step is described in more detail in the flowchart of FIG. 3.

Figure 3:
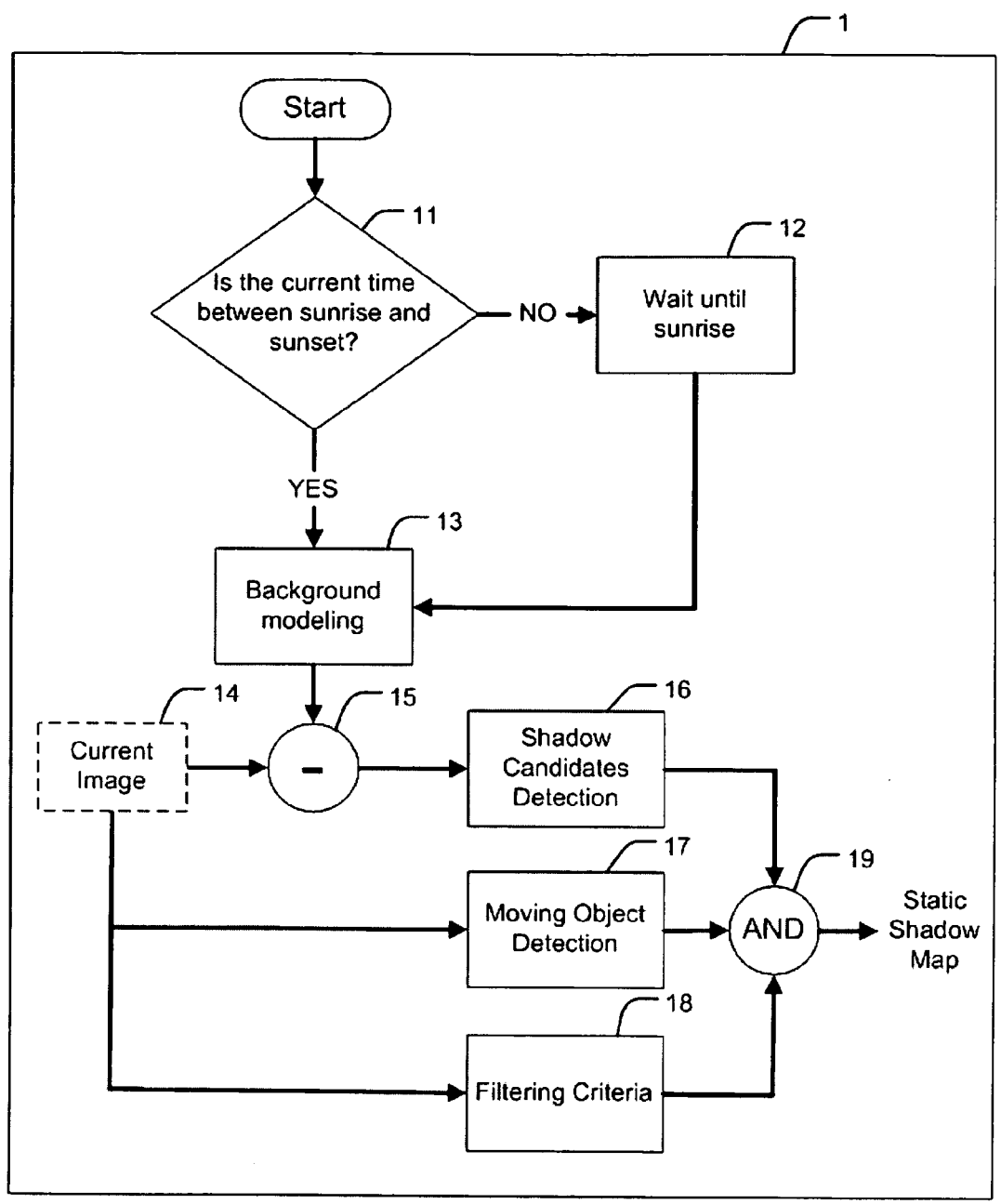
FIG. 3 shows a flowchart corresponding to an embodiment of the Static shadow detection step of FIG. 2

In FIG. 3, the process begins with Step 11. Here the current time is checked against the local sunset and sunrise times, to determine what relative period of the day it is. The current time is local to the area and time-zone in which the system is deployed. Sunrise and sunset can be defined as when the upper edge of the disk of the Sun is on the horizon, considered unobstructed relative to the location of interest. These sunrise and sunset times are also local to the area and time-zone in which the system is deployed and can be stored in a user-input table which is calibrated once upon setup and deployment of the system. Due to the fact that clear static shadows are most prominent, and therefore, most detectable during periods of daylight, it is advantageous to restrict shadow detection to time between sunrise and sunset. If the current time is found to lie within this period, then it is considered to be day at that point of time and therefore performing background modeling (Step 13) is suitable. If the current time is found to lie outside of the sunrise and sunset times, then it is considered to be night and the processing of data is disabled until the following sunrise. In this eventuality the algorithm is diverted (Step 12) to wait. In Step 12, an idle state is entered in which all processing is disabled until the time of the Sun's next rising. Ideally the process of shadow detection is meant to initialize at the time of sunrise and will produce the best results at this time, but in the event that the process is activated at some later period during the daytime, the process will still function. In Step 12 of static shadow detection process the background modeling of the scene takes place. This is done in order to produce a background image of the scene. It is advantageous that the produced background image contains no shadows therein, and hence the static shadow detection process is initialized at sunrise to generate a background image with no shadows. This step is described in more detail in the flowchart of FIG. 4.

Figure 4:
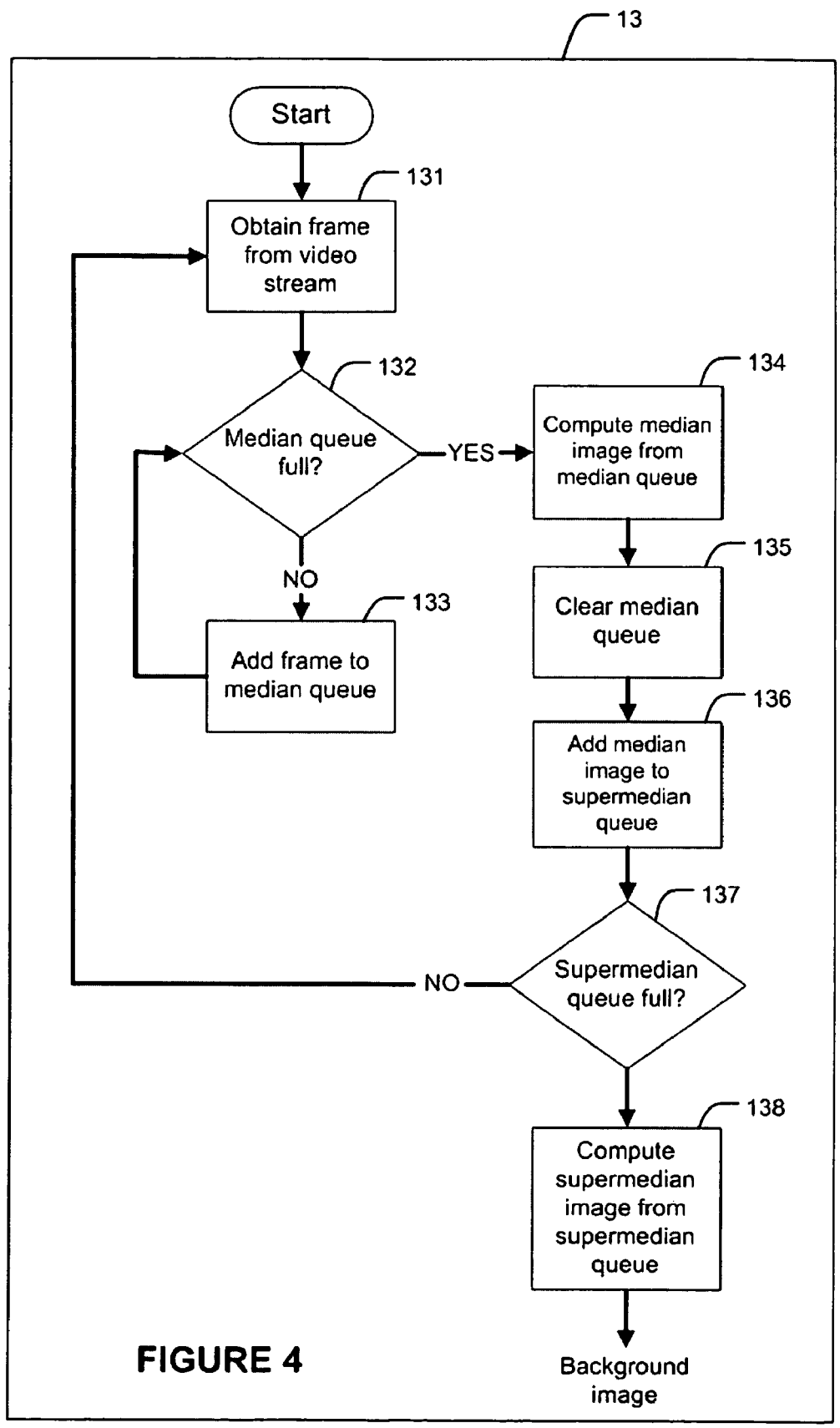
FIG. 4 shows a flowchart corresponding to an embodiment of the Background modeling step in the flowchart of FIG. 3.

FIG. 4 depicts a two decision level method. In FIG. 4, the background modeling Step 13 begins with Step 131, where the next frame is taken from the video stream. Normally the frame would be the frame taken immediately after sunrise, taking advantage of a common property of images taken during this period, that being that they are shadowless owing to the position of the Sun.

In Step 132, a queue of some length containing a series of sequential images is examined. If the queue is found to be full then the process proceeds to Step 134, otherwise it proceeds to Step 133 to add another median frame, which is an unaltered frame from the video stream.

According to Step 134, a median image is computed from the median queue. Simply, this is the process of deriving a median image from a collection of sequential frames in a queue. Every element in the median image has a median R, G and B for the three color components calculated from its corresponding location in the median queue images. With a median queue of length l for every element Pi in an image with i total pixels, then calculating the median of each element can be expressed as in (1). For each individual comparison, the R, G, B values are sorted in ascending order prior to median calculation.

$$\forall \, (\text{Median} \, (P_i))_{R,G,B} = \forall_{R,G,B} \left[ \frac{l+1}{2} \right] \quad l \text{ is odd} \qquad (1)$$

$$\forall \, (\text{Median} \, (P_i))_{R,G,B} = \forall_{R,G,B} \left[ \frac{l}{2} \right] \quad l \text{ is even}$$

In Step 135, the median queue is cleared of images in order that the process of filling it and creating a median image can be repeated.

According to Step 136, the median image created previously is added to a second queue of some length referred to as the supermedian queue.

According to Step 137, the supermedian queue is examined to determine if it is full, and in the event that it is the process continues to Step 138. Otherwise, it proceeds to Step 131 to repeat the process of filling the median queue, calculating a new median image and adding that to the supermedian queue.

According to Step 138, a median image is computed from the frames contained in the supermedian queue using the exact same methodology as before from (1). This final image, being that it is constructed as a median of median images, is consequently referred to as a supermedian image. This image serves as the defacto background image for the method of static shadow detection, and having produced and outputted this image the background modeling step completes itself, and processing returns to the main embodiment of the method for detecting environmental conditions in a sequence of images.

Returning to FIG. 3, once the background modeling has created a background image, Step 15 commences after the next image is drawn from the video stream in Step 14. In Step 15, the background image is subtracted from the current image. This is accomplished on an element by element, color component by color component basis, and this produces a color difference image.

Figure 5:
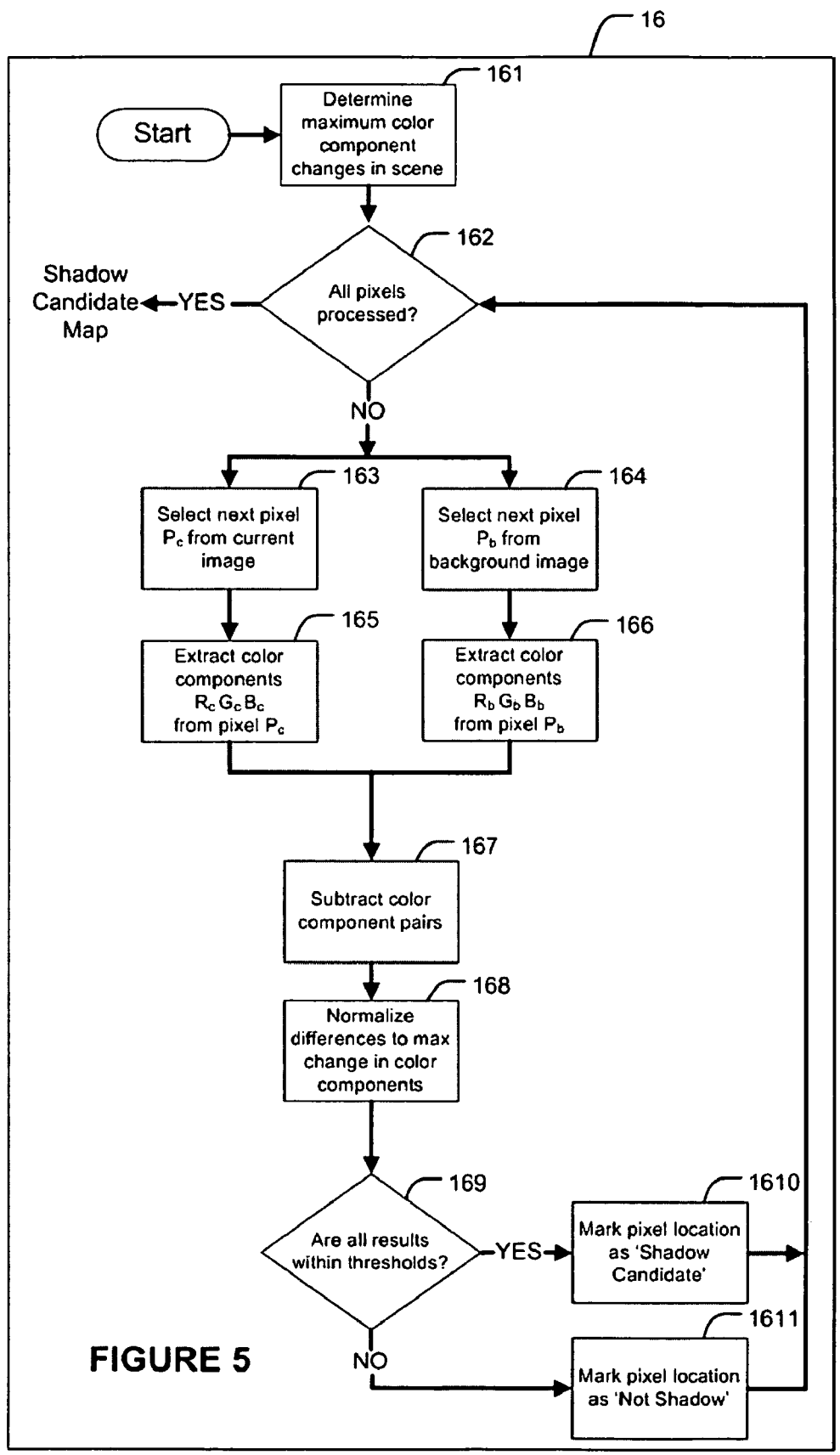
FIG. 5 shows a flowchart corresponding to an embodiment of the Shadow candidates Detection step in the flowchart of FIG. 3.

Next in Step 16 shadow candidates are selected from the current image using the color difference image, a process described in greater detail in FIG. 5.

FIG. 5 depicts a two decision level method. In FIG. 5 the shadow candidate detection Step 16 begins with Step 161, where the process determines what the maximum color component change in the scene is.

In Step 162, the process checks if all pixels are processed at this point, thereby producing the shadow candidate map and completing Step 16. Otherwise if not all pixels have been processed, then the process therefore proceeds to Steps 163 and 164. In Step 163 the next pixel $P_c$ is selected from the current image, from Step 14, and in Step 164 the next element $P_b$ is selected from the background image, from Step 13. In Step 165, the R, G, B color components (in the three color basis system) are extracted from $P_c$, and in Step 166 the same three components are extracted from $P_b$.

In Step 167, the corresponding color pairs are subtracted to produce color component differences, as in (2).

$$R_{dif} = R_c - R_b$$

$$G_{dif} = G_c - G_b$$

$$B_{dif} = B_c - B_b \qquad (2)$$

In Step 168, these differences are normalized with respect to the maximum change in color components computed from Step 161. Formulaically this can be expressed as (3):

$$R_{dif,norm} = R_{dif}/R_{max \, change}$$

$$G_{dif,norm} = G_{dif}/G_{max \, change}$$

$$B_{dif,norm} = B_{dif}/B_{max \, change} \qquad (3)$$

According to Step 169, the three resulting normalized differences from Step 168 are checked. If in all three cases the results fell within empirically-determined thresholds, the current pixel location is marked as being 'Shadow Candidate' (SC) on a binary map (Step 1610). In the event that any one or more of the comparisons failed the thresholds then the current pixel location is marked as being 'Not Shadow Candidate' ($\overline{SC}$) on the binary map (Step 1611).

Returning to FIG. 3, after shadow candidate detection is completed, moving object detection is carried out on the current image in Step 17. This step is described in more detail in the flowchart of FIG. 6.

Figure 6:
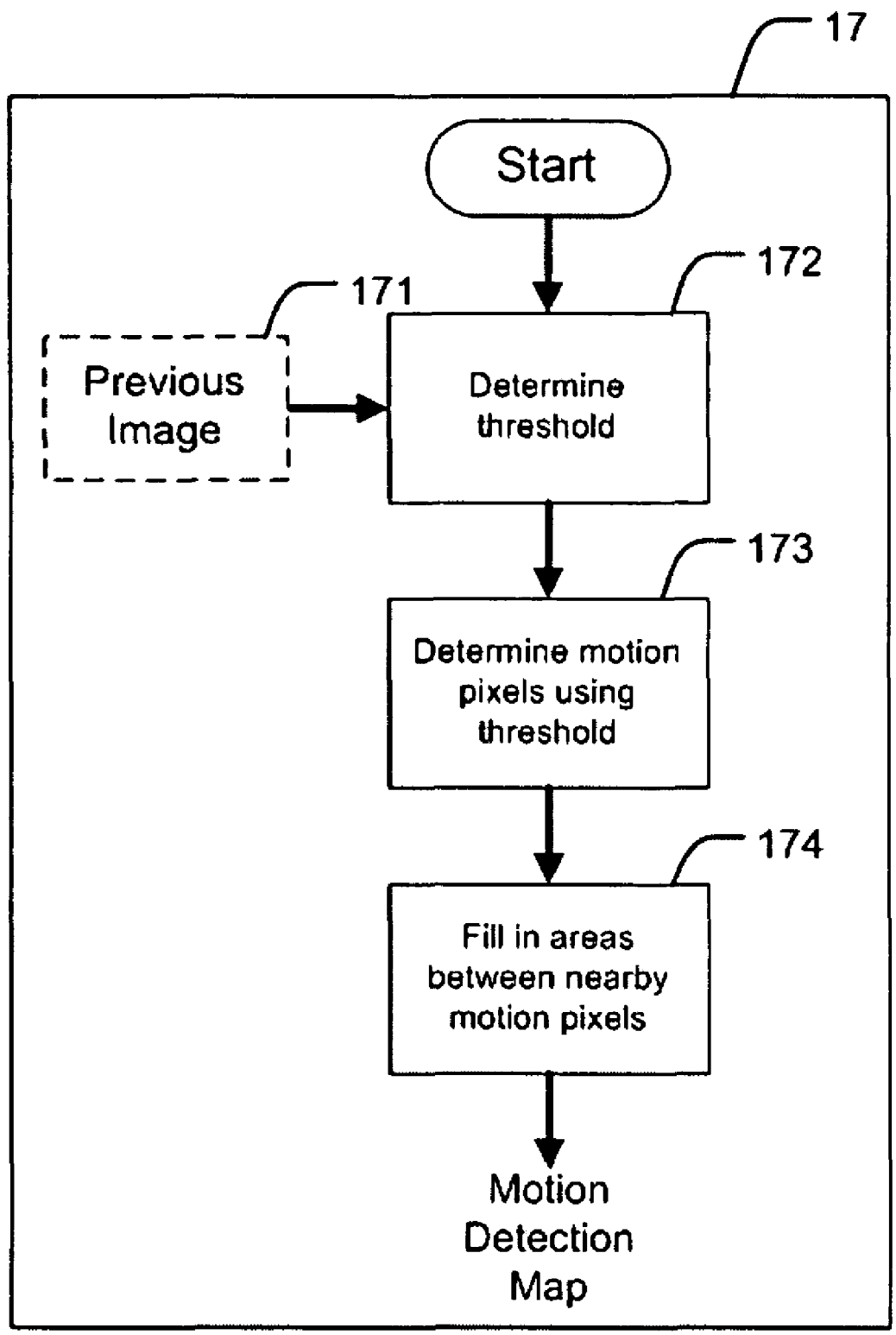
FIG. 6 shows a flowchart corresponding to an embodiment of the Moving object detection step in the flowchart of FIG. 3.

FIG. 6 depicts a straightforward process for determining the areas in a scene where motion has occurred recently. The previous image, having been recorded, is loaded from Step 171 into Step 172, where a threshold is derived based on differences between the current and previous images. This step is described in more detail in the flowchart of FIG. 7.

Figure 7:
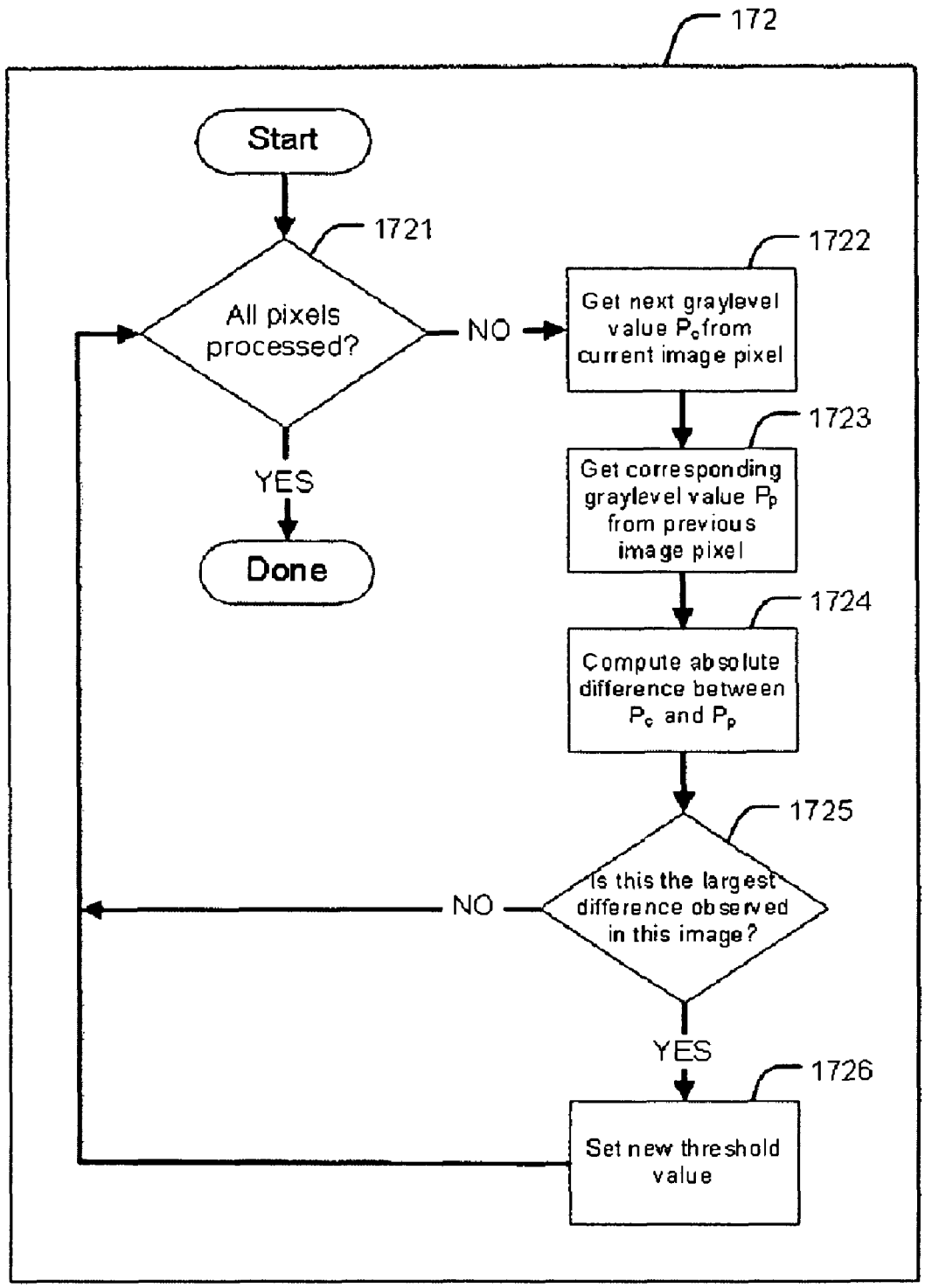
FIG. 7 shows a flowchart corresponding to an embodiment of the Determine threshold step in the flowchart of FIG. 3.

FIG. 7 depicts a two level decision method. In FIG. 7, the process begins with Step 1721, where it is checked if the pixels of the current image have all been processed. In the event that all pixels of the current image have been processed, Step 172 is complete, otherwise if not all the pixels of the current image have been processed the process proceeds to Step 1722. Here the graylevel value of the next pixel in the current image is obtained, where graylevel value is obtained from the R, G, B values (in the three color basis system). A similar process to this is also carried out in Step 1723 with respect to the next pixel of the previous image. In Step 1724 the absolute difference between the Graylevel values of the current and previous image pixels is taken; that is, $$\Delta = |P_c - P_p| \qquad (4)$$

In Step 1725, the process checks to see if the calculated absolute difference is the largest difference seen thus far in the current image comparison. In the event that the calculated absolute difference was the largest difference seen thus far, the module proceeds to set a new motion detection threshold value based on it in Step 1726. In the opposite event that the calculated absolute difference was not that largest difference seen thus far, then no such threshold is calculated. In both cases the process then proceeds back to Step 1721 to either process a new pixel or complete Step 172.

Returning to FIG. 6, after Step 172 is completed, the motion detection process proceeds to Step 173 to determine motion pixels based on the threshold computed in Step 172. Step 173 is described in more detail in FIG. 8.

Figure 8:
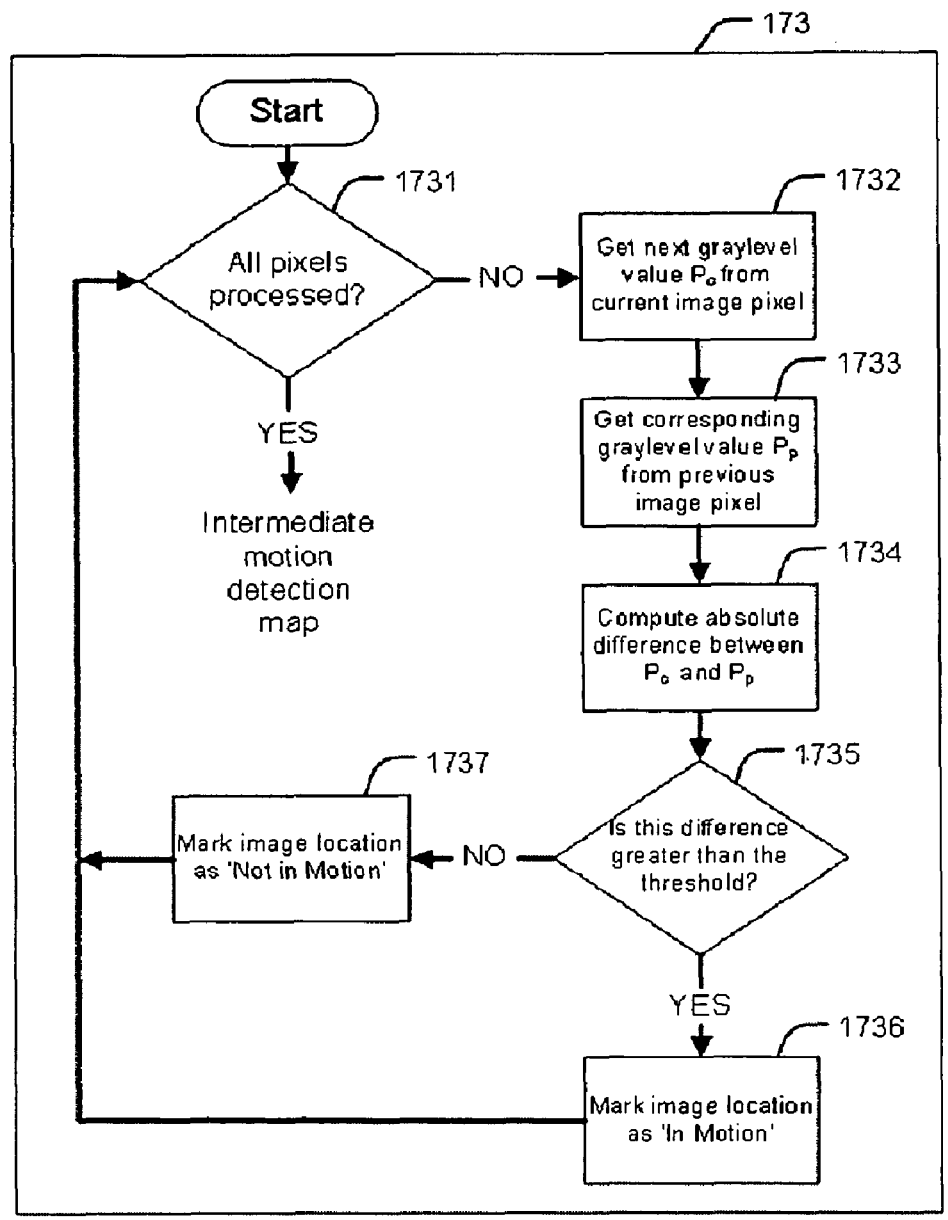
FIG. 8 shows a flowchart corresponding to an embodiment of the Determine motion pixels based on level of difference between images step in the flowchart of FIG. 3.

FIG. 8 depicts the process of marking individual pixels as either in motion or not in motion. It begins with Step 1731, where a check is performed to see whether or not all the pixels have been processed accordingly. In the event that the pixels have all been processed, an intermediate motion detection map is returned and the process continues. Otherwise, the process proceeds next to Step 1732. Here the graylevel value of the next pixel in the current image is obtained, where graylevel is obtained from the R, G, B values (in the three color basis system). A similar process to this is also carried out in Step 1733 with respect to the next pixel of the previous image. In Step 1734 the absolute difference between the graylevel values of the current and previous image pixels is taken as in equation (4).

In Step 1735, in the event that the absolute difference is greater than the threshold calculated in Step 172, the pixel at this location is marked as 'In Motion' (IM) on the intermediate motion detection map in Step 1736. Otherwise, the location is marked as 'Not In Motion' ($\overline{IM}$) in Step 1737. In either case, the process proceeds back to Step 1731 to either investigate the next pixel location or complete Step 173.

Returning to FIG. 6, after Step 173 is completed, the motion detection process proceeds to Step 174 to fill in areas between nearby motion pixels. This serves to fill in some of the gaps between areas that were detected as corresponding to motion, improving the accuracy of the motion detection process. Step 174 is described in more detail in the flowchart of FIG. 9.

Figure 9:
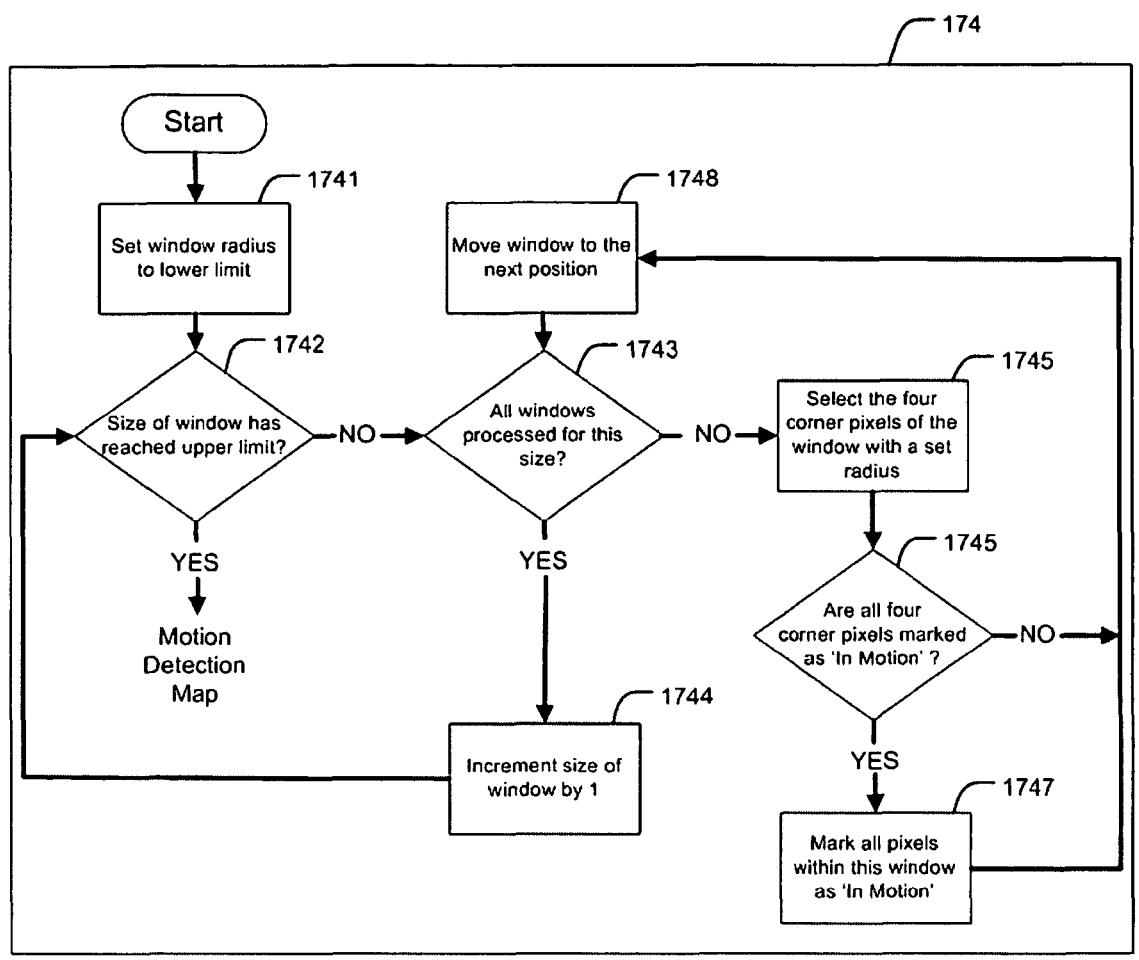
FIG. 9 shows a flowchart corresponding to an embodiment of the Fill in areas between nearby motion pixels step in the flowchart of FIG. 3.

FIG. 9 depicts a three decision level method which produces the final motion detection map. Beginning with Step 1741, a square search window within the intermediate motion detection image is created with a radius equal to a lower limit value. Next in Step 1742, process checks to see if this window has reached its maximum radius. In the event that the window has reached its maximum radius, this signals the completion of Step 174 and the final motion detection map is output. In the event that the window has not reached its maximum radius, the process proceeds to Step 1743 where another check is performed. In Step 1743, if all the windows of this radius have been processed, the window radius is increased by one pixel length. Otherwise, the process proceeds to Step 1745, where the four corner pixels that comprise the current search window are selected from the intermediate motion detection map created from Step 173. Next in Step 1746, if all four corner pixels are marked as 'In Motion' (IM), then all the pixels within the window are marked in the final motion detection map as being 'In Motion' (IM). If not all four corner pixels are marked as 'In Motion' (IM), then the pixels within the window remain unchanged. In either case, Step 1748 comes next, where the window is moved to the next position to repeat the process.

Returning to FIG. 6, after Step 174 is completed; the motion detection map is also complete, ending the motion detection process.

Returning to FIG. 3, after Step 17 is completed; filtering criteria is applied in Step 18 to the original current image frame to identify areas in advance that are not shadows, improving the accuracy of the process. Step 18 is described in more detail in FIG. 10.

Figure 10:
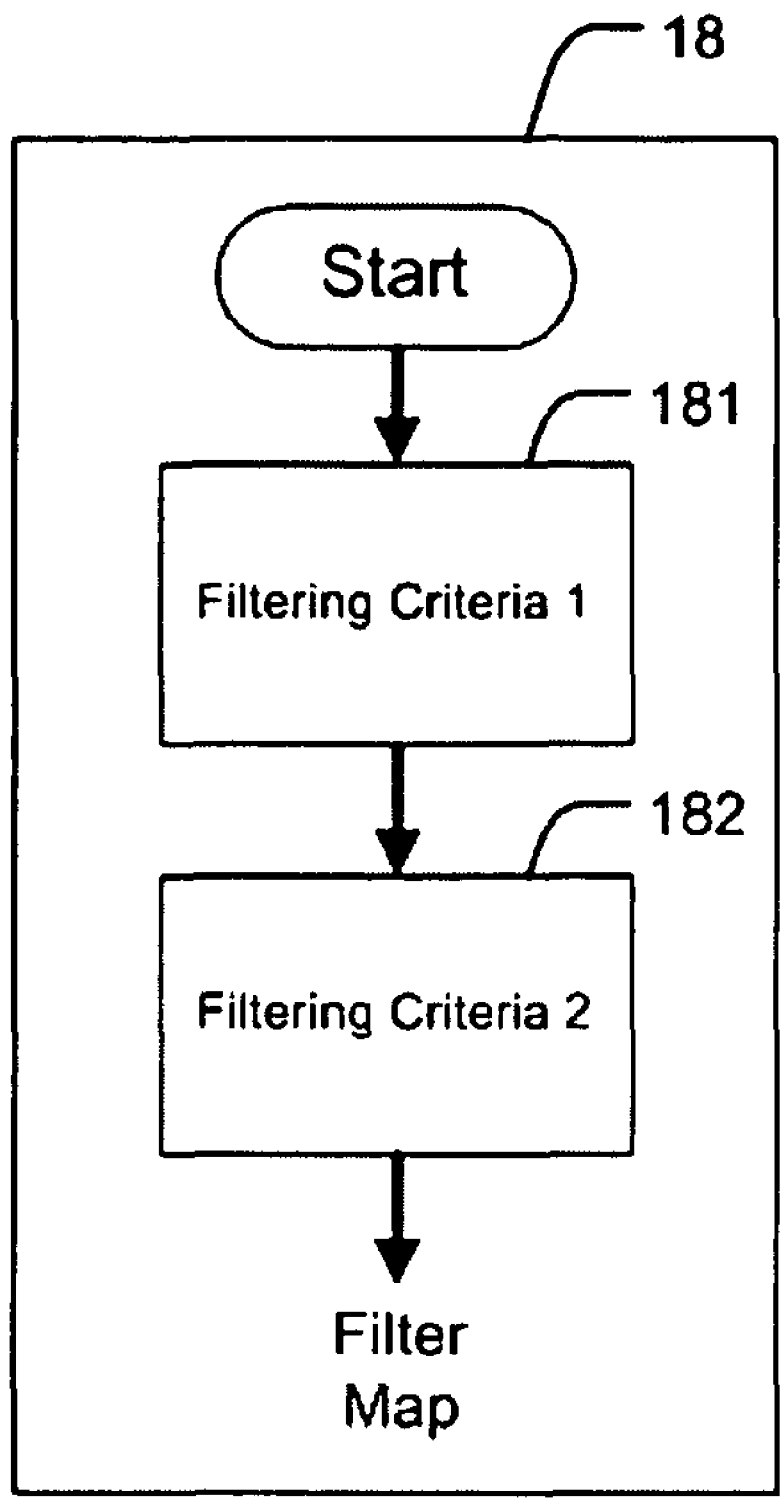
FIG. 10 shows a flowchart corresponding to an embodiment of the Filtering criteria step in the flowchart of FIG. 1.

FIG. 10 depicts the two-staged filtering process, starting with Step 181. In this step the first filtering criteria is applied to the original image, described in more detail in the flowchart of FIG. 11.

Figure 11:
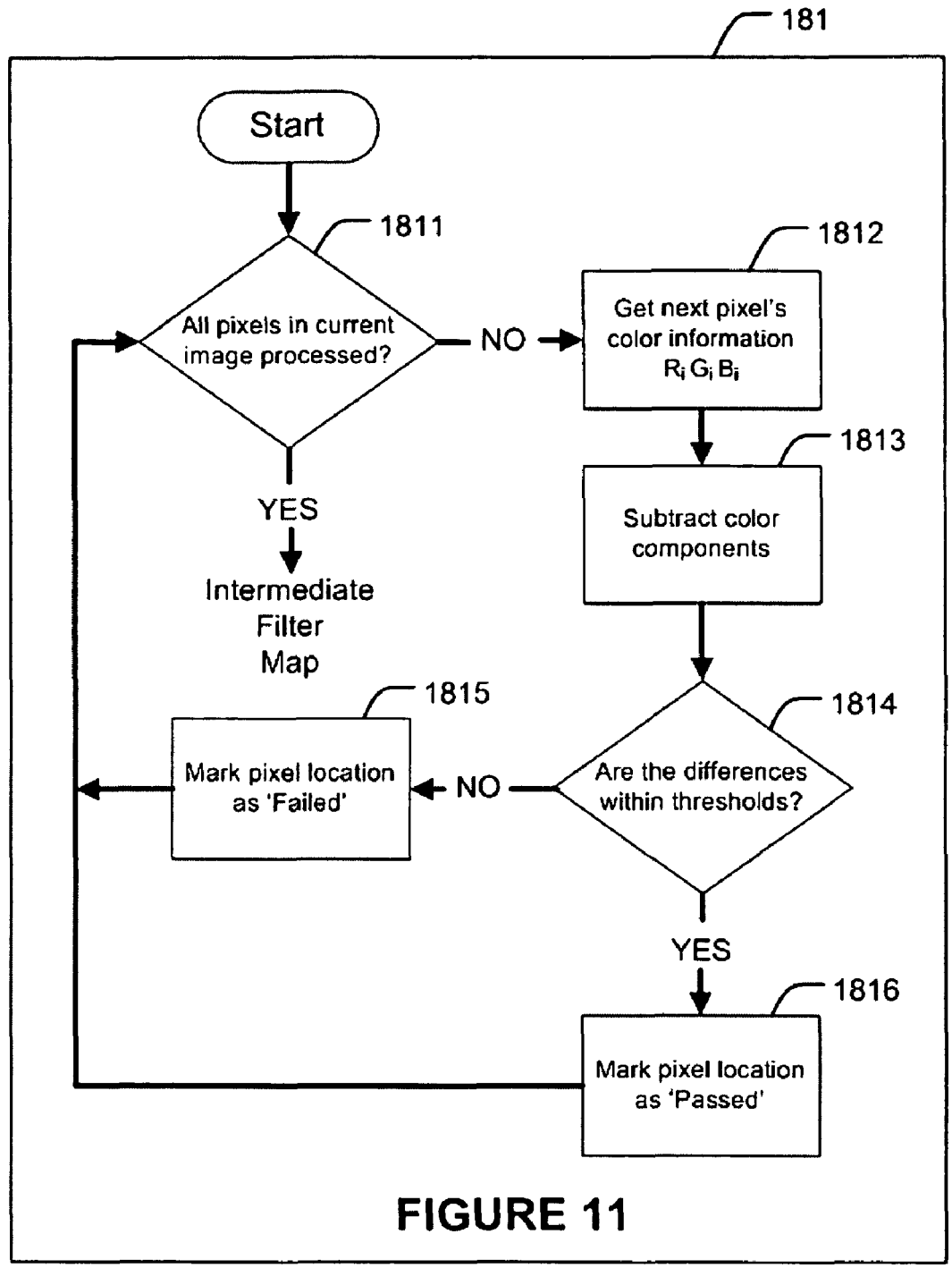
FIG. 11 shows a flowchart corresponding to an embodiment of the Filtering criteria 1 step in the flowchart of FIG. 10.

FIG. 11 depicts a two decision level method which acts as the first filter. It takes advantage of color information to mark pixel locations that cannot be shadows, allowing these areas that cannot be shadows to be removed from the overall detection process. Beginning at Step 1811, a check is performed to determine if all pixels in the current image have been processed. In the event that all pixels in the current image have been processed, the first filtering process is complete and the intermediate filter map is output. Otherwise if not all pixels in the current image have been processed, then the process proceeds to Step 1812 where the R, G, B color components are selected for the next pixel Pi. In Step 1813, the color components are subtracted from each other in the following manner, producing three distinct differences:

$$\Delta_1 = B-R \qquad (5)$$

$$\Delta_2 = R-G$$

$$\Delta_3 = G-B$$

In Step 1814, the three differences produced in Step 1813 are compared against thresholds, which are empirically determined. If any or all of the differences fail the comparisons, the current pixel location is marked as 'Failed' ($\overline{PS}$) on the intermediate filter map in Step 1815. This indicates that the element cannot be a static shadow element and this information can be useful later if this location were erroneously highlighted by the shadow candidates detection of Step 16. In the alternate case, if all three differences pass the comparisons, the current pixel location is marked as 'Passed' (PS) on the intermediate filter map in Step 1816. After the pixel location is marked, the process next proceeds back to Step 1811 to either repeat the process for another pixel location or complete the process and output the intermediate filter map.

Figure 12:
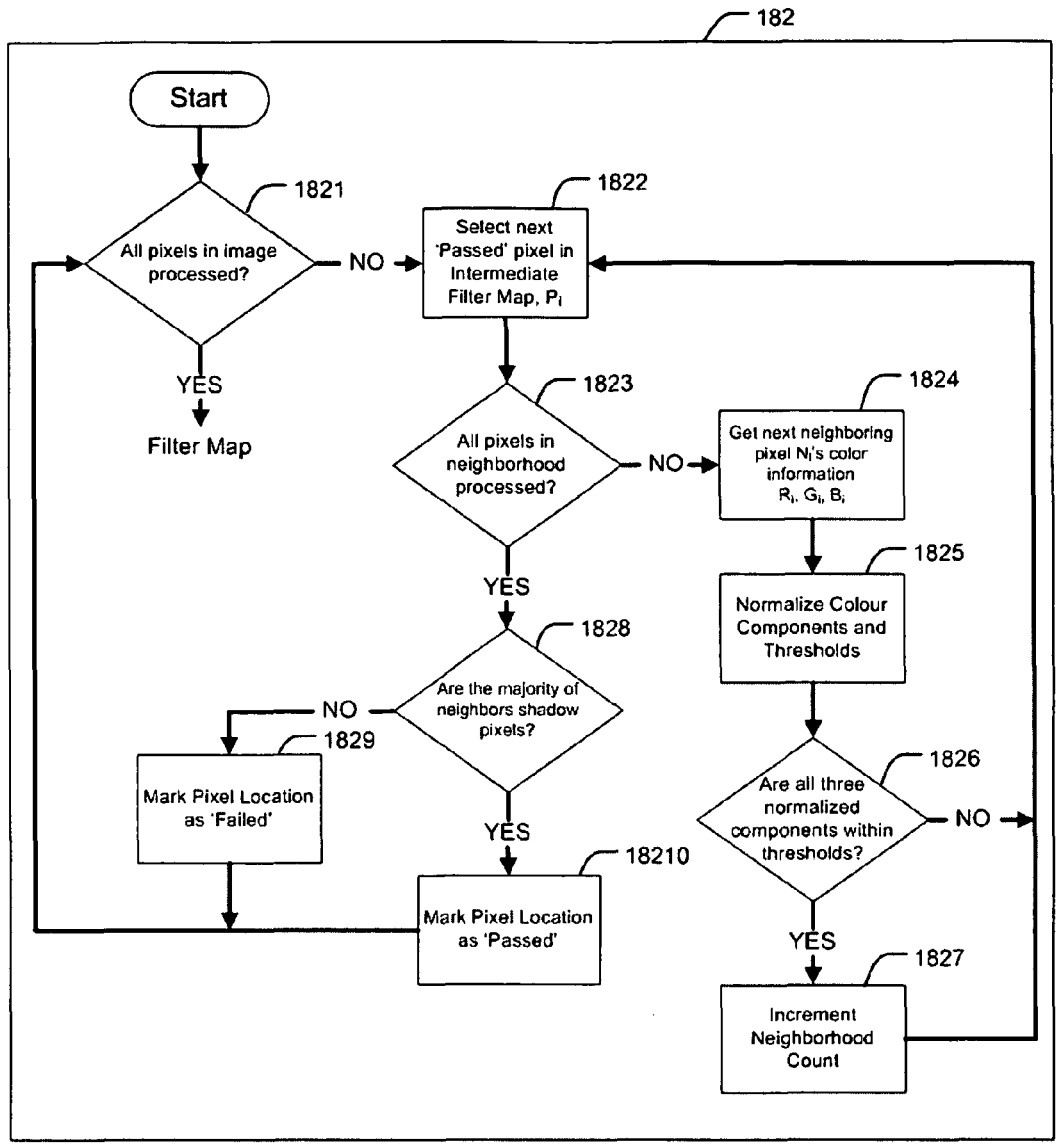
FIG. 12 shows a flowchart corresponding to an embodiment of the Filtering criteria 2 step in the flowchart of FIG. 10.

Returning to FIG. 10, after Step 181 is completed, the second filtering criteria are applied in Step 182, explained in more detail in the flowchart of FIG. 12.

FIG. 12 depicts a four decision level process. Starting with Step 1821 a check is performed to see whether or not all the pixels have been processed accordingly. In the event that all pixels have been processed, Step 182 is complete and the final filter map is output. Otherwise if not all pixels have been processed, the process proceeds to Step 1822 where the next pixel Pi from the current image which is marked in the same location as 'Passed' (PS) from the intermediate filter map (Step 181) is selected. Next in Step 1823 a check is performed to determine if all the pixels in the neighborhood of $P_i$ have been processed accordingly. In the event that they have not, the process proceeds to Step 1824 where the R, G, B color components are extracted from $P_j$. In Step 1825 the R, G, B color components (in RGB colour space) are transformed into the $C_1 C_2 C_3$ colour space according to the following equations:

$$C_1 = \arctan \frac{R}{\max(B, G)} \qquad (6)$$

$$C_2 = \arctan \frac{B}{\max(G, R)}$$

$$C_3 = \arctan \frac{G}{\max(B, R)}$$

Next in Step 1826 the normalized components r, g, b (for the three color basis system) are checked against empirically-determined thresholds. If the normalized components lie within the thresholds, then this indicates that a neighboring element of $P_i$ is considered as a possible shadow element and as such the neighborhood count is incremented by 1 in Step 1827. If the normalized components do not lie within the thresholds, then the neighboring pixel is not considered as possible a shadow element and the counter is not incremented. In either case the process proceeds back to Step 1822. When all of the neighboring elements for the selected element $P_i$ have been examined, the process proceeds from Step 1823 to Step 1828. Here another check is performed to determine if the majority of $P_i$'s neighbors are possible shadow pixels. This is done by simply comparing the neighborhood count against the number of total neighbors. In the event that the majority of neighbors are possible shadow elements the element's location is marked as 'Failed' ($\overline{PS}$) on the filter map in Step 1829. Otherwise this is marked as 'Passed' (PS) in Step 18210, indicating the lack of presence of shadow on this location. In either case, the process next proceeds to Step 1821 to either repeat the process for another element $P_i$ or complete the process by having the final binary filter map output.

Returning to FIG. 10, after Step 182 is complete the filtering process is complete and as a result the final filtering map is output.

Returning to FIG. 3, after Step 18 is complete the process proceeds to combine the maps output from Steps 16, 17 and 18 to produce the final static shadow map. In Step 19, the three maps are combined to form the final shadow map. This requires that the shadow candidate map, motion detection map and filter map are available. For each element's location $P_i$ in the three binary maps, where each map has l total pixels, a logical comparison is performed according to (7). Where the logical comparison (7) is evaluated true the element's location is marked as 'Static Shadow' (SS) in the final binary static shadow map, and where evaluated false marked as 'Not Static Shadow' ($\overline{SS}$).

$$\sum_{i=0}^{l} \text{if } (SC_i \wedge PS_i \wedge \overline{IM}_i) \quad (7)$$

Returning to FIG. 2, after static shadow detection in Step 1 is complete, the process next proceeds to glare detection in Step 2. This process is able to detect the areas in the scene where glare is present, and this step is further detailed in FIG. 13.

Figure 13:
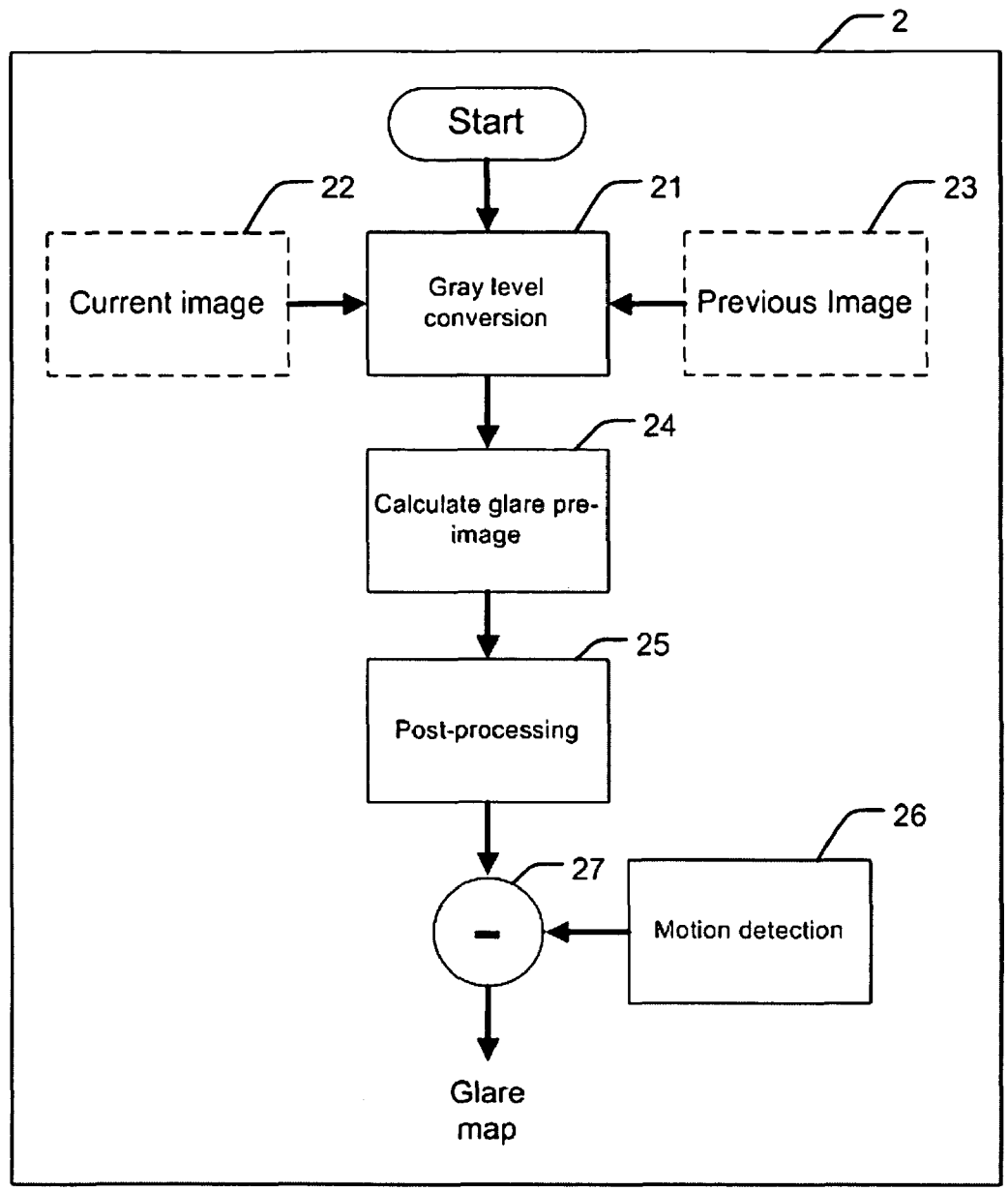
FIG. 13 shows a flowchart corresponding to an embodiment of the Glare detection step of FIG. 2.

FIG. 13 depicts the glare detection process. Here the presence or not of glare as an ambient condition in a scene is detected and mapped accordingly. Beginning with Step 21, the Graylevel conversion of both the current image (Step 22) and previous image (Step 23) is carried out.

In Step 24, the previous and current graylevel images are compared on a pixel-by-pixel basis, and the maximum pixel difference is attained similar to the process previously outlined in Step 172 on FIG. 7. From this an empirically-determined adaptive threshold for glare detection is calculated.

In Step 25, the glare pixel candidates are chosen based on how each element's color information compares to the adaptive threshold calculated prior in Step 24. On this basis a binary glare candidate map is created.

In Step 26, the same motion detection process as has been demonstrated in Step 17 of FIG. 3 is utilized to determine moving objects by comparing the current and previous images. This creates a binary motion map on which each pixel is marked as either 'In motion' (IM) or 'Not in motion' ($\overline{IM}$).

In Step 27, the final binary glare map is produced by comparing the glare candidate map of Step 25 with the motion map of Step 26. Those glare candidates which are marked as IM on the motion map are removed from the final glare map. This allows the glare detection process of the method to exclude moving glare from the detection process, such as ordinary headlights of vehicles which is unnecessary to detect as an ambient condition.

Returning to FIG. 2, after glare detection in Step 2 is complete, the process next proceeds to snow detection in Step 3. This process detects areas where snow exists in the scene and where recent changes have taken place inside these areas. Examples of situations that would be detected and mapped accordingly include a vehicle driving through snow and leaving a trail, or a maintenance vehicle that pushes snow to the side. This step is further detailed in FIG. 14.

Figure 14:
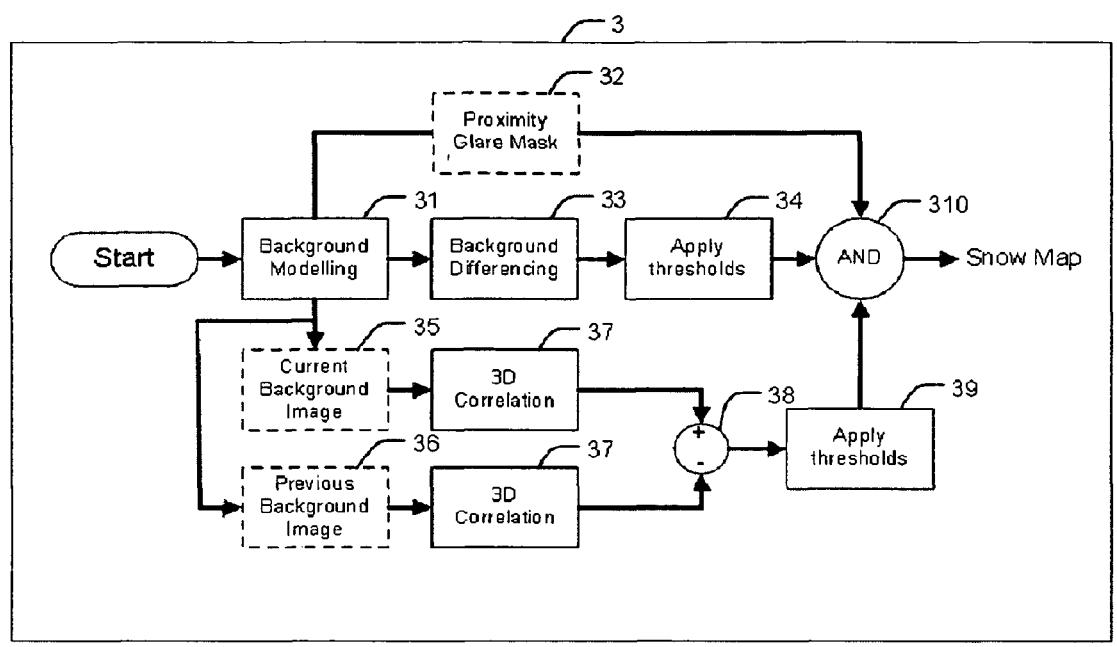
FIG. 14 shows a flowchart corresponding to an embodiment of the Snow detection step of FIG. 2.

FIG. 14 depicts a snow detection process. Here the presence or not of snow as an ambient condition is detected in the scene and mapped accordingly. Beginning with Step 31, the background is modeled, using the current image input from Step 32. This step is further detailed in FIG. 15.

Figure 15:
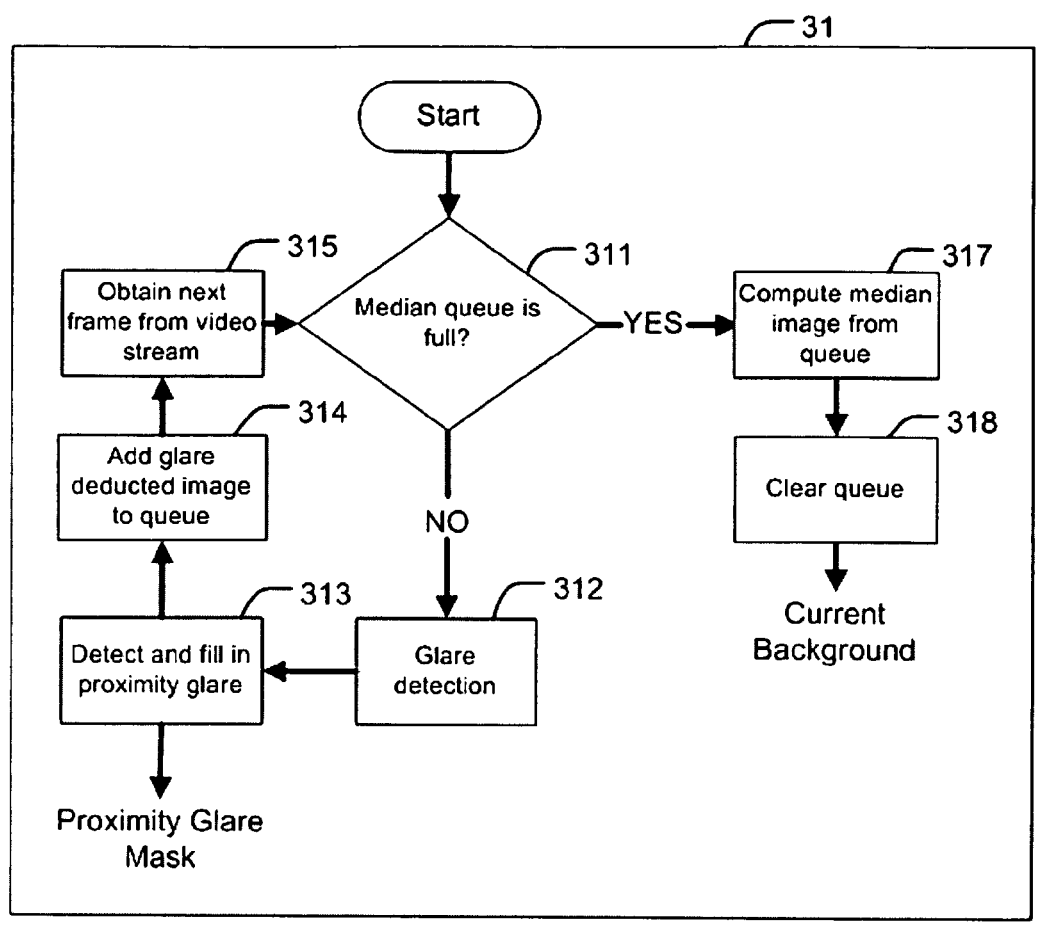
FIG. 15 shows a flowchart corresponding to an embodiment of the Background modeling step of FIG. 14.

FIG. 15 depicts a single decision level process. This is similar in idea to the background modeling in Step 13 in FIG. 3, but has some significant differences. First of all, this process relies on the glare detection process described in FIG. 13, it also is only a single level median filter, as opposed to FIG. 3, which depicts a dual level median filter whereby the median of the median image is calculated.

Beginning in Step 311, the process checks if the median queue is full. In the event that the median queue is not yet full, this would indicate the process must add more frames to the queue to generate a background, and proceeds to Step 312. In this step the glare detection process is called upon to detect areas affected by glare in the image. This step calls upon the same glare detection process of Step 2 of FIG. 2. Next in Step 313 the elements in the neighborhood or close proximity of the glare pixels, detected in Step 312 which generally detects only the umbra of glare, are detected and filled to generate a proximity glare mask and remove proximity glare pixels from the current image. The process of Step 313 essentially enlarges the glare detected areas, filling in the glare penumbras around the detected glare elements from Step 312. The binary proximity glare map produced in Step 313 is output at this stage to Step 37 of FIG. 14 for later processing. Each pixel in this map is marked either as 'Glare' (GL) or 'No glare' ($\overline{GL}$).

Next in Step 314 the areas of the current image which are marked as glare are replaced with the values from the last background image generated by Step 31. Replacing glare elements with previous values allows the background modeling to produce higher quality backgrounds, since the appearance of glare in a scene can otherwise decrease the accuracy of this process.

Next in Step 316, the next frame is obtained from the video stream. Background modeling requires a number of frames equal to the length of the median queue before a background image can be generated. Having obtained the next image, the process resumes in Step 311.

In Step 311, in the event that the median queue is full, the process can next generate a background image. In Step 317, the process generates a median image from the median queue, applying the same steps as in Step 134 and equation (1).

Next in Step 318, the queue is cleared and the background image is output to Step 34, concluding Step 31.

Returning to FIG. 14, after background modeling in Step 31 is completed; background differencing is next processed in Step 33. This step is further detailed in FIG. 16.

Figure 16:
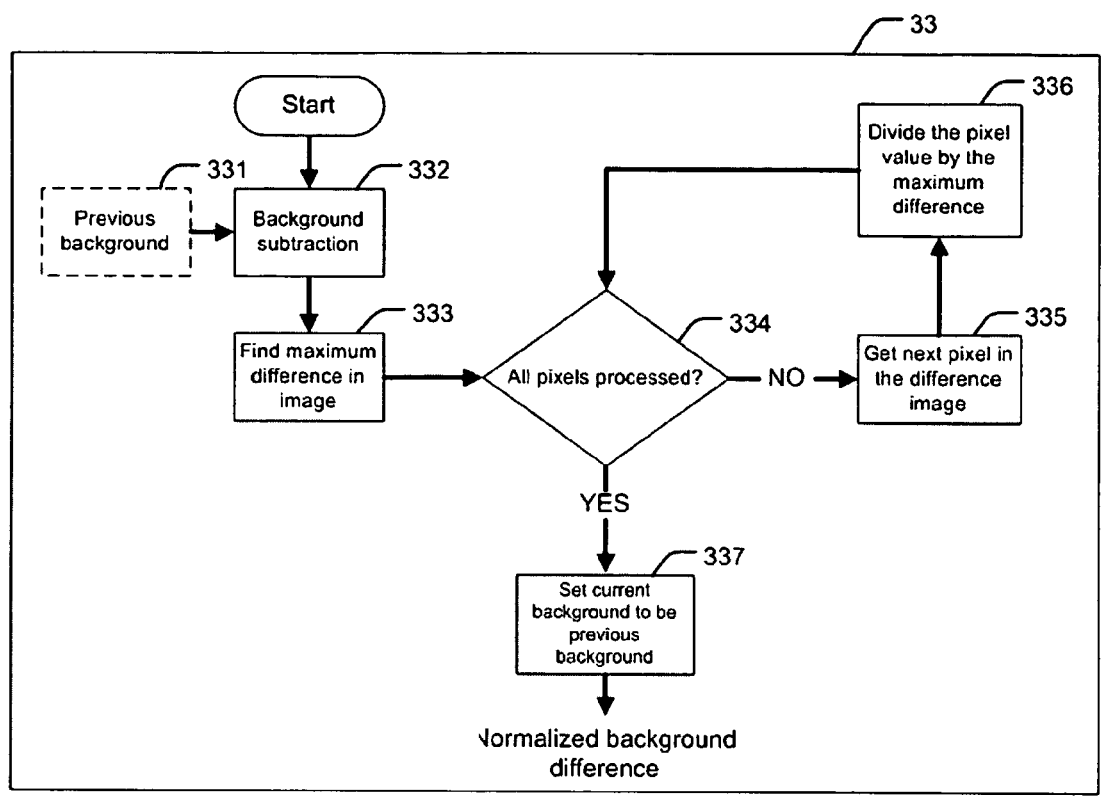
FIG. 16 shows a flowchart corresponding to an embodiment of the Background differencing step of FIG. 14.

FIG. 16 depicts a single decision level process. The purpose of background differencing is to produce a map depicting what areas in the image stream have changed since the last background was generated. Beginning in Step 331, the previous background as generated by Step 31 of FIG. 14 is introduced to the process. In Step 332, this previous background is subtracted from the current background and the absolute value of this subtraction is calculated, generated by Step 31 of FIG. 14. This step produces a background difference image.

In Step 333, the maximum difference in the background difference image is detected. Next in Step 334, the process checks to determine if all pixels have been processed in the background difference image. In the event they are not, the process continues to Step 335, where the next element in the difference image is selected.

Next in Step 336, the pixel value at the location selected in Step 335 is divided by the maximum image difference value calculated in Step 333, hence normalizing the value at this location. From here the process continues to Step 334 again. In the event that all of the elements in the background difference image have been processed, it next proceeds to Step 337 where the current background image is saved as the previous background image, allowing it to be used in Step 331 upon next calling of the background differencing process. Concluding this step, the background differencing process of Step 33 is complete and the normalized background difference map image is output.

Returning to FIG. 14, after the completion of Step 33, the application of thresholds to the background difference image is performed in Step 34. Here each individual pixel $P_i$ of the background difference image is compared against a threshold. If the individual pixel of the background difference is greater than the threshold, then the pixel is marked as having undergone recent change (CH). Otherwise if the individual pixel is less than the threshold, then that pixel is marked as not having undergone recent change ($\overline{CH}$) on the binary background differencing map created in this step.

In Step 37, the three dimensional correlation is applied to the current background image from Step 35 and the previous background image from Step 36. The current and previous background images are processed to locate snow in each image and detect changes in snow. This step locates snow in an image by comparing small areas of the current image of some height and width against sample images of snow of the same height and width taken from a database for this particular time of day. The method of comparison here is essentially two dimensional correlation performed on flattened RGB images. Since standard cross-correlation is computationally expensive to calculate in real-time, a more efficient method such as Fast Normalized Cross Correlation (FNCC) is used to calculate cross-correlation.

Figure 17:
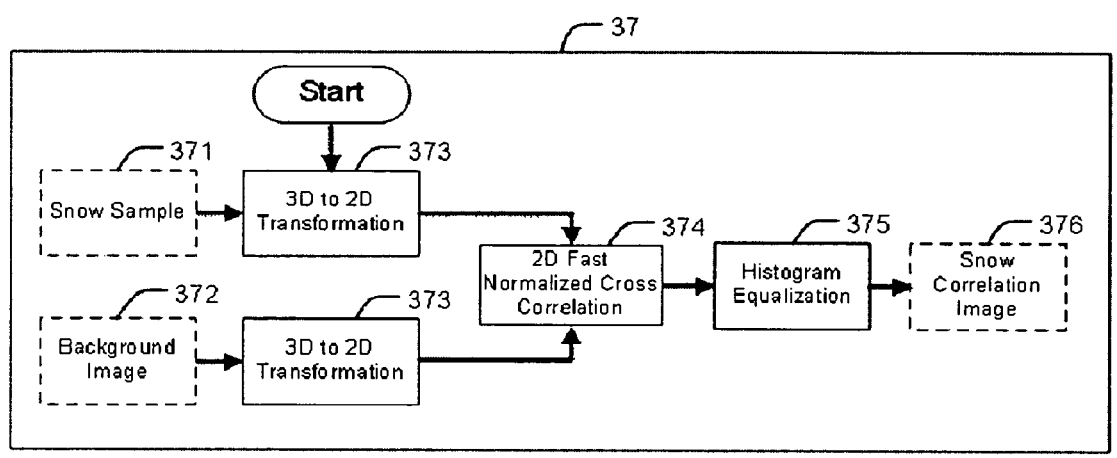
FIG. 17 shows a flowchart to an embodiment of the three dimensional correlation step of FIG. 14.

In FIG. 17 the process begins at Step 373. In Step 371 a snow sample image is chosen based on the time of day and local sunrise/sunset times. The colour snow sample from Step 371, is then transformed from a three dimensional data structure to a two dimensional data structure with no loss of data. In Step 372 a background image, from either Step 35 or Step 36, is introduced to the process. The background image is transformed in Step 373 in a manner identical to the transformation which the snow sample image from Step 371 has undergone.

The transformations of the snow sample image and background image are necessary to allow the calculation of 2D fast normalized cross correlation in Step 374 between the two images based on their colour information.

Correlation performed in Step 374 produces an intermediate correlation image that may require additional processing. The requirement is determined by calculating the maximum value in the intermediate correlation image in a manner similar to that shown in Step 172. If the maximum value is greater than an empirically determined threshold, histogram equalization is performed in Step 375 which adjusts the intermediate correlation image to increase the contrast and refine snow detection. If the maximum value is less than that threshold, this is an indication that the background image from Step 372 does not contain snow and histogram equalization is unnecessary, therefore it is not performed.

After histogram equalization has been performed, or not, the snow correlation image shown in Step 376 is the output of the process. Returning to FIG. 14, the change in the scene due to snow is calculated by finding the absolute value of the difference between the current background snow correlation image and the previous background snow correlation image in Step 38.

In Step 39, thresholds are applied to the correlation difference map produced in Step 38. Pixels which held values above a certain empirically-determined threshold are marked as 'Snow changed' (SC), whereas pixels with values below the threshold are marked as 'Not snow changed' ($\overline{SC}$).

In Step 310, a comparison is carried out between the glare proximity map from Step 31, the background difference map from Step 34, and the snow changed map from Step 39. For each element location $P_i$ in the three binary maps, where each map has l total pixels, a logical comparison is performed according to (8), where evaluated true the pixel location is marked as 'Snow' (SN) in the final binary snow map, and where evaluated false marked the pixel location is marked as 'Not snow' ($\overline{SN}$).

$$\sum_{i=0}^{l} \text{ if } (\overline{GL_i} \wedge CH_i \wedge SC_i) \tag{8}$$

Returning to FIG. 2, after snow detection in Step 3 is completed, the process next proceeds to rain detection in Step 4. This step detects areas where rain or water deposits exist in a scene and where recent changes have taken place inside these areas. Examples of situations that would be detected and mapped accordingly include a vehicle driving through a puddle on a roadway and splashing water or leaving a trail. Moreover, rain detection in Step 4 can also detect rain droplets collecting on a video camera. This process of rain detection is almost identical in process to snow detection, as has been illustrated in Step 3 prior. At the conclusion of this process a rain map is output.

After Step 4 is complete, the method has finished one complete cycle. This process as a whole may repeat indefinitely as new images of the scene are input, with the method continuing to illuminate the static shadow, glare, snow and rain in a scene. This method can be used in any system for automatic detection of the ambient conditions in a scene from a sequence of images.

The method for detecting environmental conditions in a sequence of images can be implemented on a computer system. A process of implementing the method may be stored on computer readable material. The computer system can acquire successive frames of data and the data processor can process the frames of data as a part of a method of implementing the AID system.

In the claims, the word "comprising" is used in its inclusive sense and does not exclude other elements being present. The indefinite article "a" before a claim feature does not exclude more than one of the feature being present.

Immaterial modifications may be made to the embodiments described here without departing from what is covered by the claims.

What is claimed is:

1. A method for shadow detection in a series of image frames, the method comprising repeating the following steps:
   acquiring a reference frame containing data elements, a current frame of data elements, and a third frame of data elements;
   comparing corresponding elements of the current frame and the third frame to detect elements that correspond to motion;
   comparing corresponding elements of the current frame and the reference frame, eliminating from comparison elements detected to correspond to motion; and
   using the comparison of corresponding elements of the current frame and the reference frame to create a static shadow map indicating which elements of the current frame correspond to shadows of objects not appearing in the current frame;

in which acquiring the reference frame, the current frame and the third frame is carried out with a digital video camera and the comparing steps are carried out in a computing system.

2. The method of claim 1 in which comparing corresponding elements further comprises creating an initial set of elements which are candidates for being shadows.

3. The method of claim 1 in which the reference frame is generated by a series of successive frames that contain no shadows.

4. The method of claim 3 in which the reference frame is generated immediately after sunrise.

5. The method of claim 3 further comprising generating the reference frame by averaging a number of frames.

6. The method of claim 1 in which comparing corresponding elements comprises:
  computing a difference between the current frame and the reference frame; and
  determining if the difference lies between two thresholds.

7. The method of claim 1 in which each data point of the reference frame and each data point of the current frame has color components.

8. The method of claim 1 further comprising filtering by determining elements that do not correspond to shadows.

9. The method of claim 1 carried out as part of a method of video surveillance.

10. The method of claim 9 in which the method of video surveillance is video surveillance of a roadway.

11. A non-transitory computer-readable medium having stored thereon computer programmable code which implements the method of claim 1.

12. The method of claim 1 in which comparing corresponding elements of the current frame and the reference frame is not performed when the current frame corresponds to a time after sunset and prior to sunrise.

13. A method for shadow detection in a series of image frames, the method comprising repeating the following steps:
  acquiring a reference frame containing data elements, a current frame of data elements, and a third frame of data elements;
  comparing corresponding elements of the current frame and the third frame to detect elements that correspond to motion;
  comparing corresponding elements of the current frame and the reference frame, eliminating from comparison elements detected to correspond to motion; and
  using the comparison of corresponding elements of the current frame and the reference frame to create a static shadow map indicating which elements of the current frame correspond to shadows of objects not appearing in the current frame;
  in which acquiring the reference frame, the current frame and the third frame is carried out with one or more of a digital video camera, radar image, or ultra sound device and the comparing steps are carried out in a computing system.

* * * * *